(12) United States Patent
Seto

(10) Patent No.: US 8,397,795 B2
(45) Date of Patent: Mar. 19, 2013

(54) HEAT EXCHANGER FOR VEHICULAR AIR CONDITIONING APPARATUS

(75) Inventor: Takahiro Seto, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 727 days.

(21) Appl. No.: 12/579,732

(22) Filed: Oct. 15, 2009

(65) Prior Publication Data

US 2011/0088880 A1  Apr. 21, 2011

(51) Int. Cl.
*F28D 1/053* (2006.01)
(52) U.S. Cl. ............................ 165/41; 165/153; 165/175
(58) Field of Classification Search ................ 165/41, 165/202, 204, 167, DIG. 36, 42, 172, 152, 165/153, 175
See application file for complete search history.

(56) References Cited

U.S. PATENT DOCUMENTS

| | | | | |
|---|---|---|---|---|
| 4,482,009 A * | 11/1984 | Nishimura et al. | ........... | 165/203 |
| 5,219,024 A * | 6/1993 | Potier | ........... | 165/173 |
| 5,309,731 A * | 5/1994 | Nonoyama et al. | ........... | 62/244 |
| 6,102,103 A * | 8/2000 | Zobel et al. | ........... | 165/10 |
| 6,166,351 A * | 12/2000 | Yamamoto | ........... | 219/202 |
| 6,253,841 B1 * | 7/2001 | Obara et al. | ........... | 165/204 |
| 6,273,184 B1 * | 8/2001 | Nishishita | ........... | 165/140 |
| 6,311,763 B1 * | 11/2001 | Uemura et al. | ........... | 165/43 |
| 6,360,817 B1 * | 3/2002 | Brochin et al. | ........... | 165/140 |
| 6,622,787 B1 * | 9/2003 | Toyoshima et al. | ........... | 165/203 |
| 6,874,575 B2 * | 4/2005 | Kim | ........... | 165/204 |
| 6,959,754 B2 * | 11/2005 | Lee et al. | ........... | 165/42 |
| 7,299,863 B2 * | 11/2007 | Lee et al. | ........... | 165/152 |
| 7,347,248 B2 * | 3/2008 | Kolb et al. | ........... | 165/42 |
| 7,798,205 B2 * | 9/2010 | Minami et al. | ........... | 165/133 |
| 2002/0017383 A1 * | 2/2002 | Vincent | ........... | 165/204 |
| 2004/0050531 A1 * | 3/2004 | Horiuchi et al. | ........... | 165/41 |
| 2007/0095515 A1 * | 5/2007 | Morishita et al. | ........... | 165/183 |
| 2007/0095517 A1 * | 5/2007 | Schall | ........... | 165/204 |
| 2008/0041571 A1 * | 2/2008 | Minami et al. | ........... | 165/151 |

FOREIGN PATENT DOCUMENTS

| | | |
|---|---|---|
| JP | 10-278547 | 10/1998 |
| JP | 10278547 A * | 10/1998 |
| JP | 2002-205122 | 7/2002 |

* cited by examiner

*Primary Examiner* — Teresa Walberg
(74) *Attorney, Agent, or Firm* — Rankin, Hill & Clark LLP

(57) ABSTRACT

In a heater core that constitutes part of a vehicular air conditioning apparatus, first and second fins having louvers therein are arranged between a plurality of tubes. The first fins are disposed on a first heating section, which faces toward a first front passage through which air from a first blower unit flows, whereas the second fins are disposed on a second heating section, which faces toward a first rear passage through which air from a second blower unit flows. Further, as a boundary portion between the first heating section and the second heating section, partitioning fins, which do not contain any louvers therein, are disposed separately from the first and second fins.

20 Claims, 10 Drawing Sheets

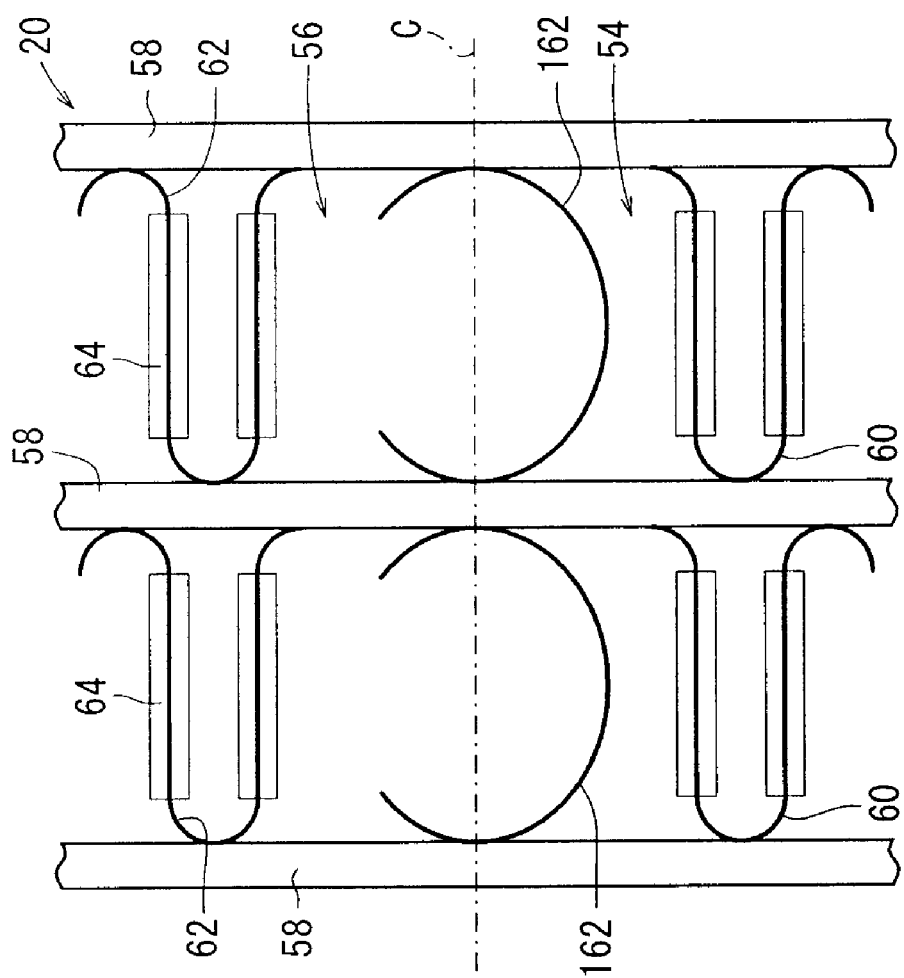

HEAT EXCHANGER FOR VEHICULAR AIR CONDITIONING APPARATUS

BACKGROUND OF THE INVENTION

1. Field of the Invention

The present invention relates to a heat exchanger, which is installed in a vehicular air conditioning apparatus that performs temperature adjustment of a vehicle compartment, whereby the heat exchanger is used by the vehicular air conditioning apparatus for cooling and heating air that is blown into the vehicle compartment.

2. Description of the Related Art

A vehicular air conditioning apparatus, which is mounted in a vehicle, for example, is equipped with a first blower for drawing in air from the vehicle interior into a casing, and a second blower for drawing in air from the interior and exterior of the vehicle into the casing. In this case, for example, air that is introduced from an internal air introduction port by rotation of the first blower is heated by a first heat exchanger, passes through a first air passage, and is blown out from face blow-out ports, or foot blow-out ports in the vehicle compartment from a blow-out port. Together therewith, air that is introduced from an external air introduction port by rotation of the second blower, after being heated by a second heat exchanger, passes through a second air passage and is blown out from defroster blow-out ports.

Further, the above-mentioned heat exchanger, for example, comprises a plurality of tubes which are arranged in two layers in a thickness direction of the heat exchanger, and fins which are bent or folded in an undulating or wavy shape, and which are disposed between the tubes. Plural louvers, through which air passes, are provided in the fins.

With a vehicular air conditioning apparatus equipped with this type of heat exchanger, there is a tendency for the air supplied from the first blower and the air supplied from the second blower to become mixed inside of the heat exchanger. Thus, as disclosed in Japanese Laid-Open Patent Publication No. 10-278547, in order to prevent mixing of air inside the heat exchanger, a heat exchanger is used in which a louverless portion, which does not contain any louvers therein, is set and provided within a portion of the fins, the louverless portion being arranged at a boundary region between a passage through which the air from the first blower flows and another passage through which the air from the second blower flows.

On the other hand, when the fins constituting the aforementioned heat exchanger are fabricated, as disclosed in Japanese Laid-Open Patent Publication No. 2002-205122, a band plate is supplied between a first press-forming roll and a second press-forming roll, which are mutually enmeshed together, such that simultaneously with bending of the band plate in an undulating shape and forming the fins by rotation of the first and second forming rolls, plural louvers are formed in the fins by means of louver cutting teeth, which are provided in the first and second forming rolls.

However, in the case that fins having a louverless portion therein, as discussed above, are formed by the first and second forming rolls, since the louver cutting teeth need not be provided at a region corresponding to the louverless portion, when the fins are fabricated, the need arises for the region where the louverless portion resides and a region in the direction of rotation of the first and second forming rolls to be positioned mutually with respect to each other. As a result, the preparations for the forming step become more complex, and productivity tends to be lowered.

Further, normally, in the case of forming the fins, the first and second rolls are rotated multiple times (through multiple rotations), in which fins having a predetermined length in the longitudinal direction are to be formed. However, in the case that the first and second forming rolls are rotated multiple times while a louverless portion is provided, the louverless portion ends up being formed at two or more locations in the fin. Furthermore, in the case that only a single louverless portion is sought to be formed, it is necessary to fabricate the entire fin by effecting only one rotation of the first and second forming rolls. In this case, the first and second forming rolls must be made larger in diameter, accompanied by an undesirable increase in scale of the forming apparatus.

SUMMARY OF THE INVENTION

A general object of the present invention is to provide a heat exchanger for use in a vehicular air conditioning apparatus, in which a partitioning member can easily be manufactured and installed in the heat exchanger, such that air flows supplied respectively to first and second passages inside the vehicular air conditioning apparatus are reliably separated and made independent from each other, whereby such air can be blown out reliably into the vehicle compartment from predetermined blow-out ports.

In order to achieve the aforementioned object, the present invention is characterized by a heat exchanger in a vehicular air conditioning apparatus having a casing including first and second passages therein through which air flows, a damper mechanism for switching a flow state of the air in the passages, and first and second blowers for supplying air respectively to the interior of the casing. The heat exchanger is disposed in the interior of the casing so as to straddle between the first passage and the second passage, for thereby cooling and heating the air and supplying the air.

The heat exchanger includes a plurality of tubes through which a medium flows in the interior thereof, a first fin disposed on a first heat exchanger section, the first fin being bent in a wavy shape and having an air hole therein through which the air flows, for carrying out heat exchange on the air that flows through the first passage inside the casing, a second fin disposed on a second heat exchanger section, the second fin being bent in a wavy shape and having an air hole therein through which the air flows, for carrying out heat exchange on the air that flows through the second passage, and a partitioning member provided separately from the first and second fins and disposed between the first heat exchanger section and the second heat exchanger section. The partitioning member serves to block air from flowing between the first heat exchanger section and the second heat exchanger section.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 10 is an enlarged plan view of a heater core with partitioning members installed therein according to a second modification.

DESCRIPTION OF THE PREFERRED EMBODIMENTS

Figure 1:
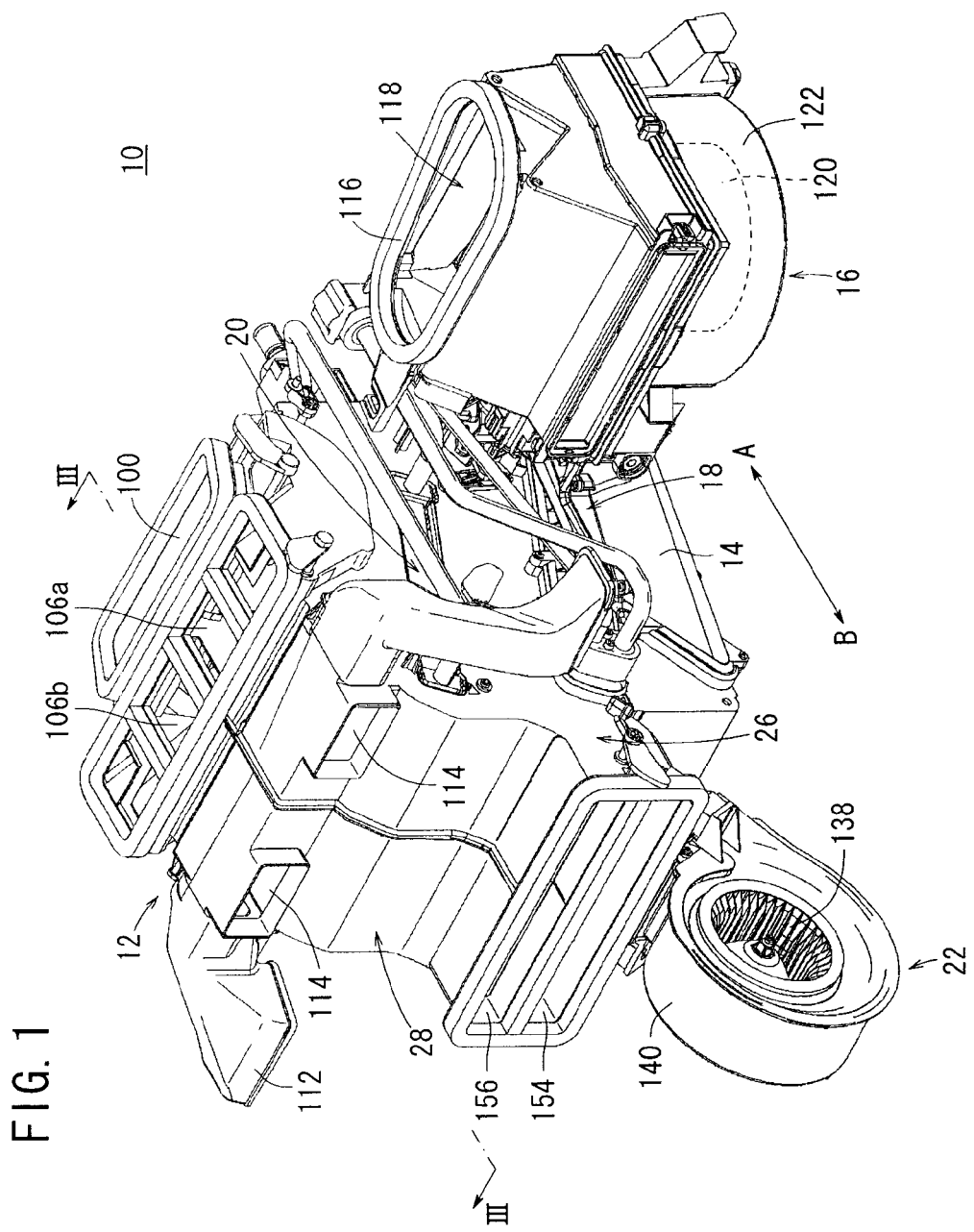
FIG. 1 is an external perspective view of a vehicular air conditioning apparatus according to an embodiment of the present invention.

Preferred embodiments of a heat exchanger which is used in a vehicular air conditioning apparatus according to the present invention will be presented and described in detail below with reference to the accompanying drawings. In FIG. 1, reference numeral 10 indicates a vehicular air conditioning apparatus according to an embodiment of the present invention. The vehicular air conditioning apparatus 10, for example, is mounted in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Figure 2:
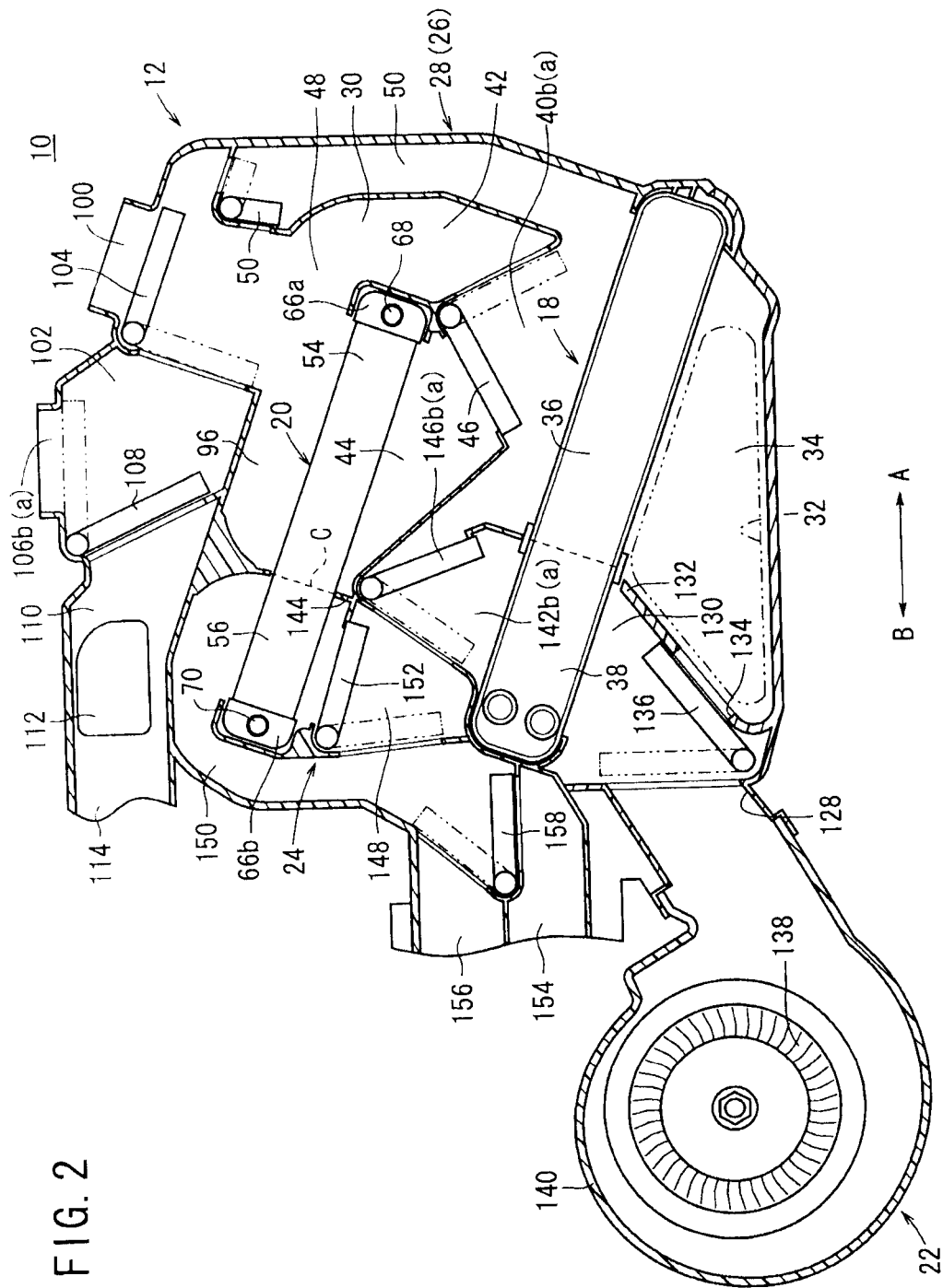
FIG. 2 is an overall cross sectional view of the vehicular air conditioning apparatus shown in FIG. 1.

Further, the vehicular air conditioning apparatus 10 is installed so that the right-hand side thereof shown in FIG. 2 (in the direction of arrow A) is oriented toward the front side of the vehicle, whereas the left-hand side (in the direction of arrow B) is oriented toward the rear side of the vehicle. The arrow A direction shall be described as a forward direction, whereas the arrow B direction shall be described as a rearward direction.

In the present embodiment, inside a casing 12, plural rotating members made up of dampers or the like are provided, wherein the rotating members are operated by rotational drive sources such as motors or the like. For purposes of simplification, depictions and explanations concerning such rotational drive sources have been omitted.

Figure 3:
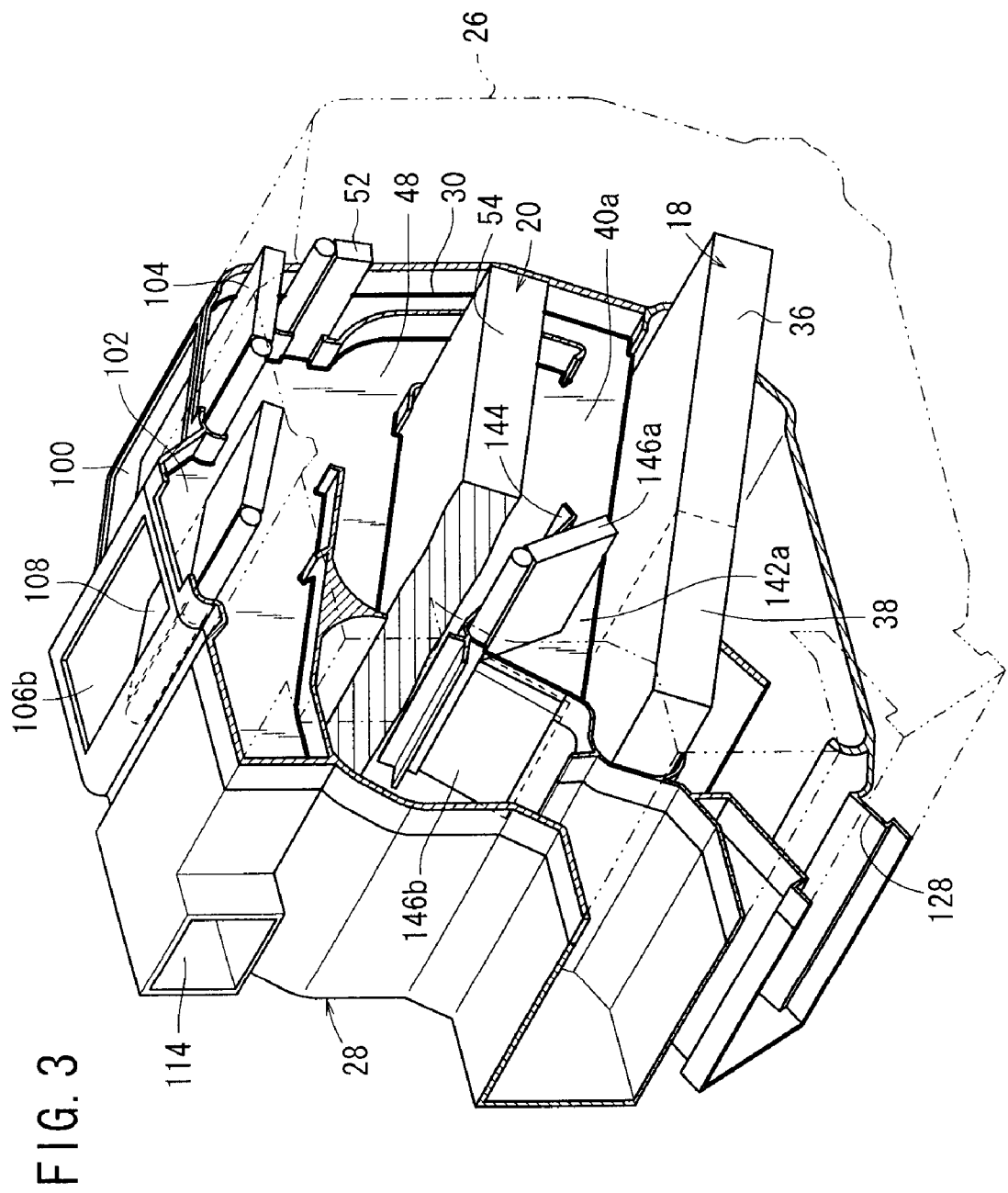
FIG. 3 is a cross sectional perspective view taken along line III-III of FIG. 1.

As shown in FIGS. 1 through 3, the vehicular air conditioning apparatus 10 includes the casing 12 constituted by respective air passages, a first blower unit 16 connected through a connection duct 14 to a side portion of the casing 12 for blowing out air toward a front seat side of the vehicle, an evaporator (heat exchanger) 18 arranged inside the casing 12 for cooling air, a heater core (heat exchanger) 20 for heating air, a second blower unit 22 connected to a lower portion of the casing 12 for taking in air from inside the vehicle compartment (interior air) and blowing the air toward the rear seats of the vehicle, and a damper mechanism 24 for switching the flow of air that flows through and inside each of the respective passages.

The casing 12 is constituted by first and second divided casings 26, 28 having substantially symmetrical shapes, wherein a center plate 30 is disposed between the first divided casing 26 and the second divided casing 28. The connection duct 14 is connected on a lower side portion of the first divided casing 26, and a first intake port 32 is formed through which air is supplied from the first blower unit 16. The first intake port 32 communicates with a first front passage (first passage) 34 disposed on an upstream side of the evaporator 18.

The evaporator 18 is disposed so as to straddle between the first divided casing 26 and the second divided casing 28. One end of the evaporator 18 in the forward direction (the direction of arrow A) of the vehicle is inclined downward at a predetermined angle with respect to the other end thereof in the rearward direction of the vehicle.

The evaporator 18 includes a first cooling section (first heat exchanger section) 36 that faces toward the first front passage 34 and which cools air supplied from the first front passage 34, and a second cooling section (second heat exchanger section) 38 that faces toward a later-described first rear passage 130 and which cools air supplied from the first rear passage 130.

On the other hand, as shown in FIGS. 1 through 3, on the downstream side of the evaporator 18, second front passages 40a, 40b are formed, through which air having passed through the first cooling section 36 is supplied. Upwardly of the second front passages 40a, 40b, a third front passage 42 and a fourth front passage 44 are formed in a branching or bifurcated manner. Further, in the second front passages 40a, 40b, a first air mixing damper 46 is rotatably disposed so as to face toward the branching portion of the third front passage 42 and the fourth front passage 44.

Additionally, by rotation of the first air mixing damper 46, the blowing condition and blowing rate of cooled air that has passed through the evaporator 18 into the third front passage 42 and the fourth front passage 44 is adjusted. The third front passage 42 is arranged on the forward side (in the direction of arrow A), whereas the fourth front passage 44 is arranged on the rearward side (in the direction of arrow B) of the casing 12. The heater core 20 is disposed on a downstream side of the fourth front passage 44.

Further, on the forward side (in the direction of arrow A) of the third front passage 42, a bypass passage 50 is formed, which extends along the third front passage 42 and supplies air to a later-described mixing section 48 from the downstream side of the evaporator 18, and a bypass damper 52 is disposed on a downstream side of the bypass passage 50. The bypass passage 50 is provided to supply cool air cooled by the evaporator 18 directly to the downstream side under a switching action of the bypass damper 52.

The heater core 20, similar to the evaporator 18, is disposed so as to straddle between the first divided casing 26 and the second divided casing 28. One end of the heater core 20 in the forward direction (the direction of arrow A) of the vehicle is inclined downward at a predetermined angle with respect to the other end thereof in the rearward direction (the direction of arrow B) of the vehicle.

Further, the heater core 20 includes a first heating section (first heat exchanger section) 54, which faces the fourth front passage 44 and heats air supplied from the fourth front passage 44, and a second heating section (second heat exchanger section) 56, which faces a later-described third rear passage 148 and heats air supplied from the third rear passage 148.

Figure 4:
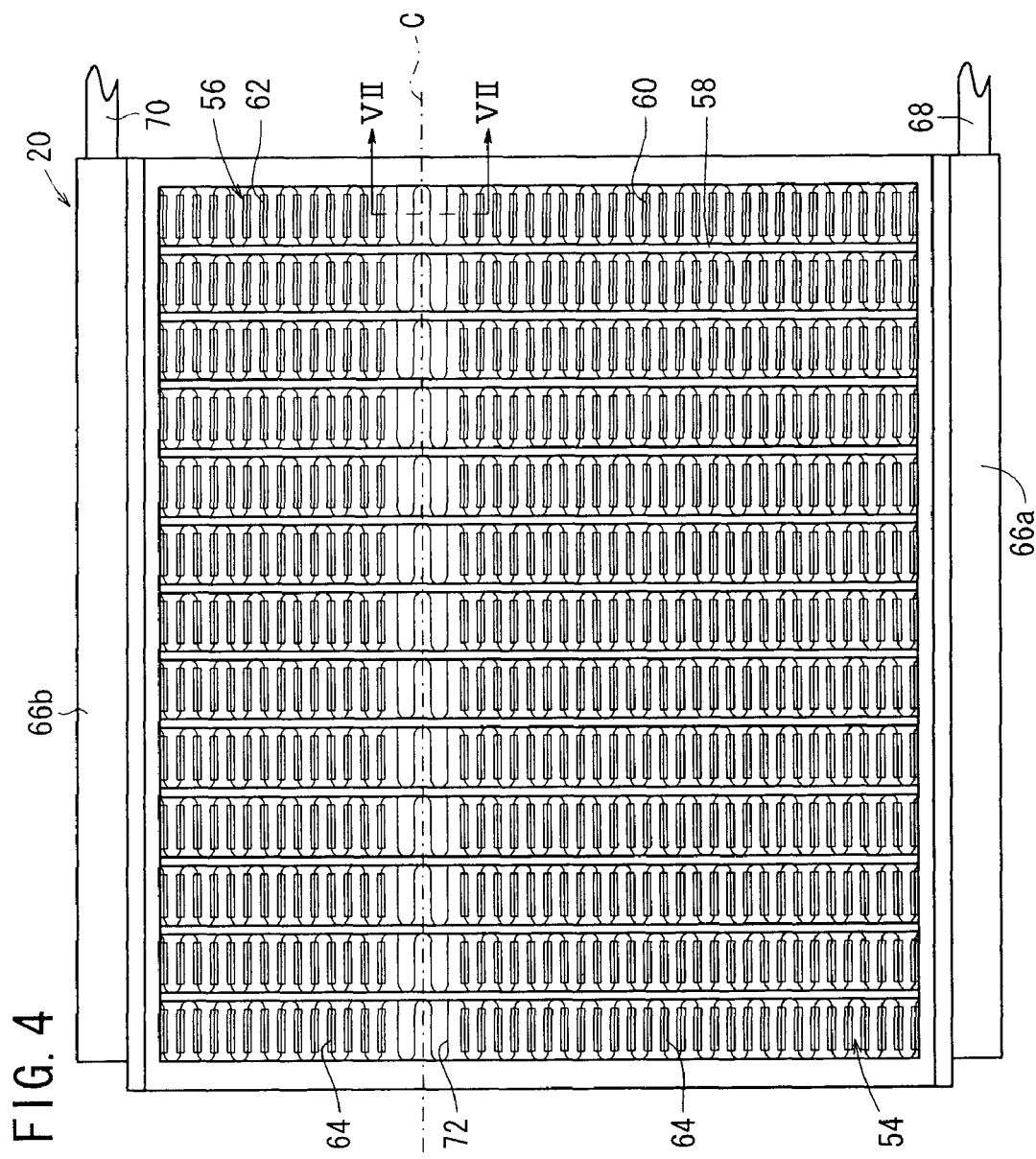
FIG. 4 is an overall plan view of the heater core shown in FIG. 2.

As shown in FIG. 4, in the heater core 20, for example, a pair of tubes 58 are formed from thin plates of aluminum or the like, and first and second fins 60, 62, which are folded in a serpentine or undulating (wavy) shape, are disposed respectively between the stacked tubes 58. On the first and second fins 60, 62, plural louvers (air holes) 64 are formed, which are cut out so as to be inclined at predetermined angles with respect to planar surfaces of the first and second fins 60, 62.

The first fins 60 are disposed on the first heating section 54, whereas the second fins 62 are disposed on the second heating section 56, in the heater core 20. In addition, by causing hot water to flow through the interior of the tubes 58, air that passes through the louvers 64 and flows between the first and second fins 60, 62 is heated by the hot water and is supplied to the downstream side as heated air. The pair of tubes 58 are arrayed in parallel and arranged in two layers in the thickness direction of the heater core 20.

Further, hollow tank portions 66a, 66b are connected respectively to both ends of the tubes 58 in the heater core 20. Hot water that flows through the interior of the tubes 58 is retained in the tank portions 66a, 66b. In addition, a supply conduit 68 through which hot water is supplied from the exterior is connected to one of the tank portions 66a, and a discharge conduit 70 through which the hot water having circulated through the interior of the heater core 20 is discharged is connected to the other tank portion 66b.

Figure 5:
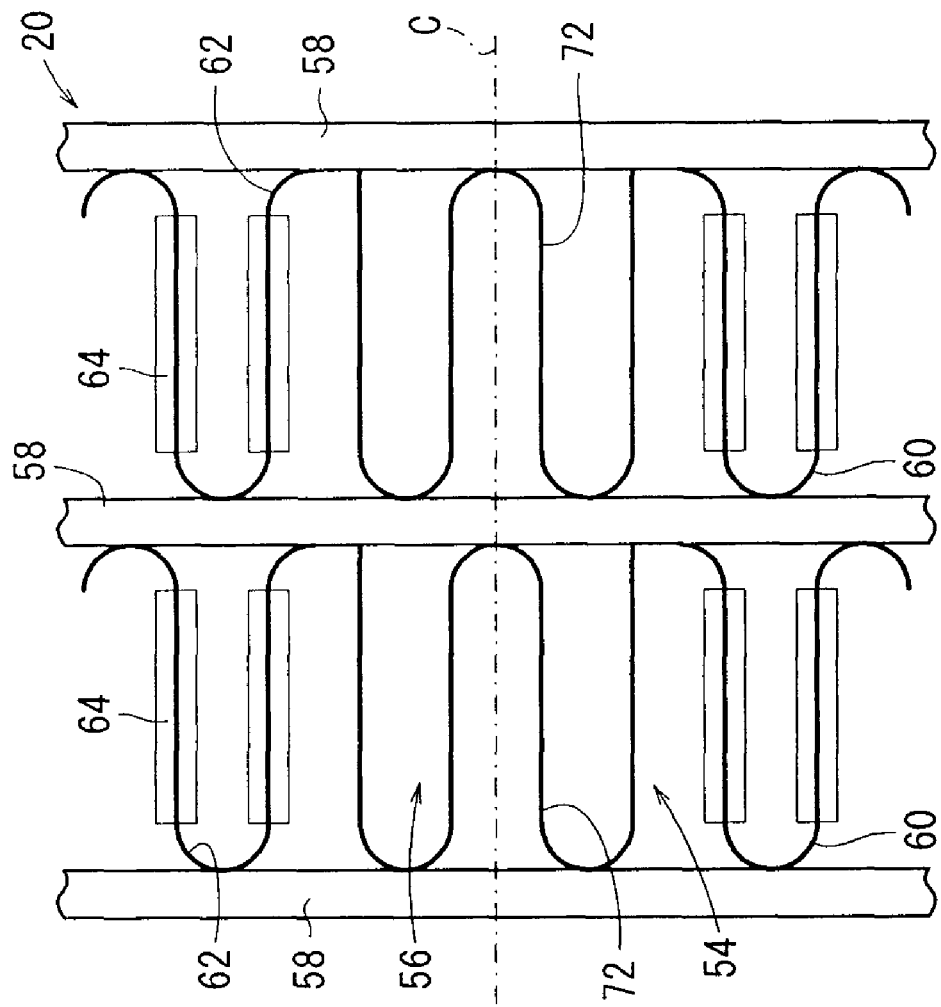
FIG. 5 is an enlarged plan view showing the vicinity of a boundary portion between a first heating section and a second heating section in the heater core of FIG. 4.
Figure 6:
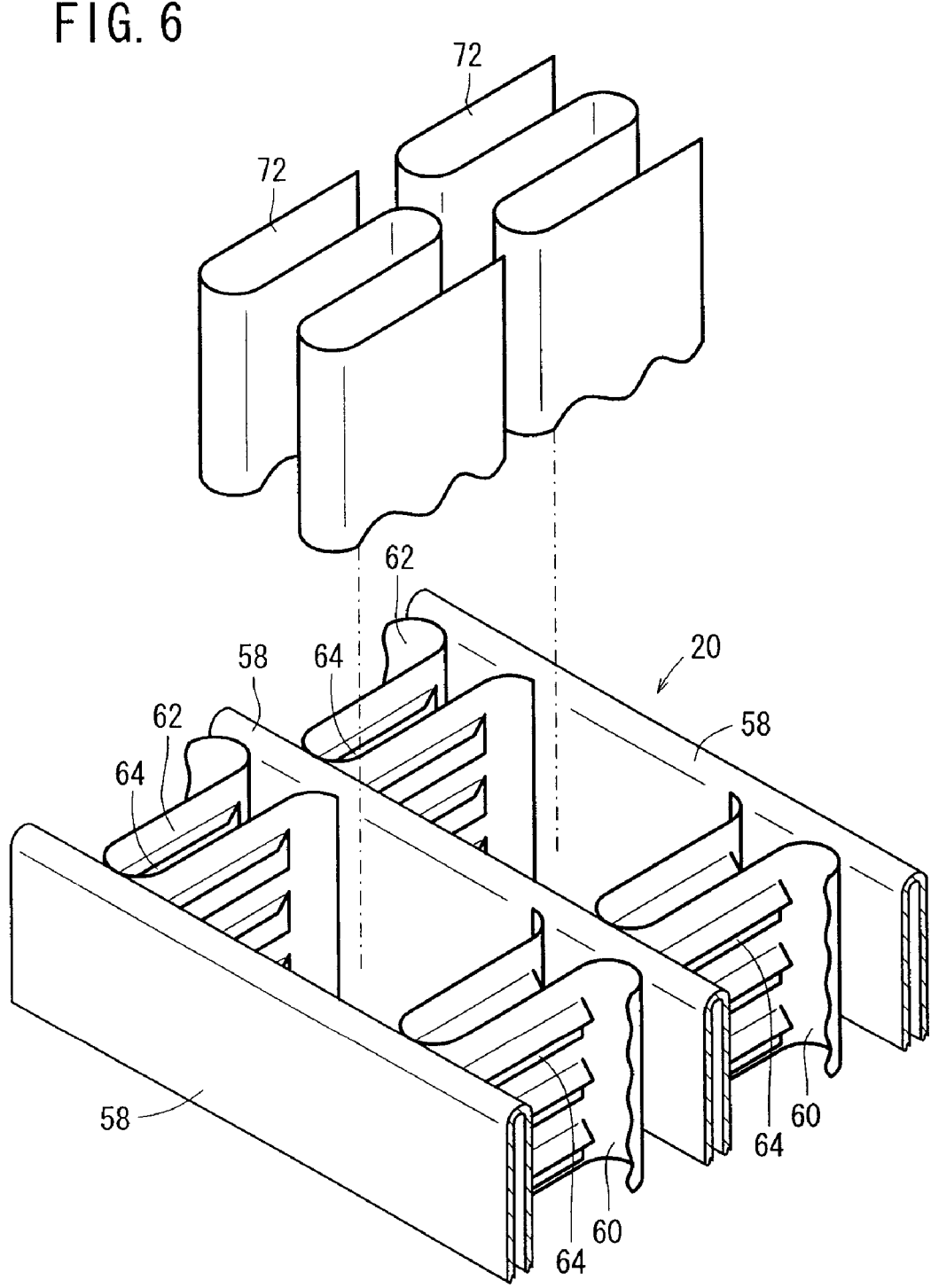
FIG. 6 is an exploded perspective view showing a state in which partitioning members are detached from the heater core of FIG. 5.
Figure 7:
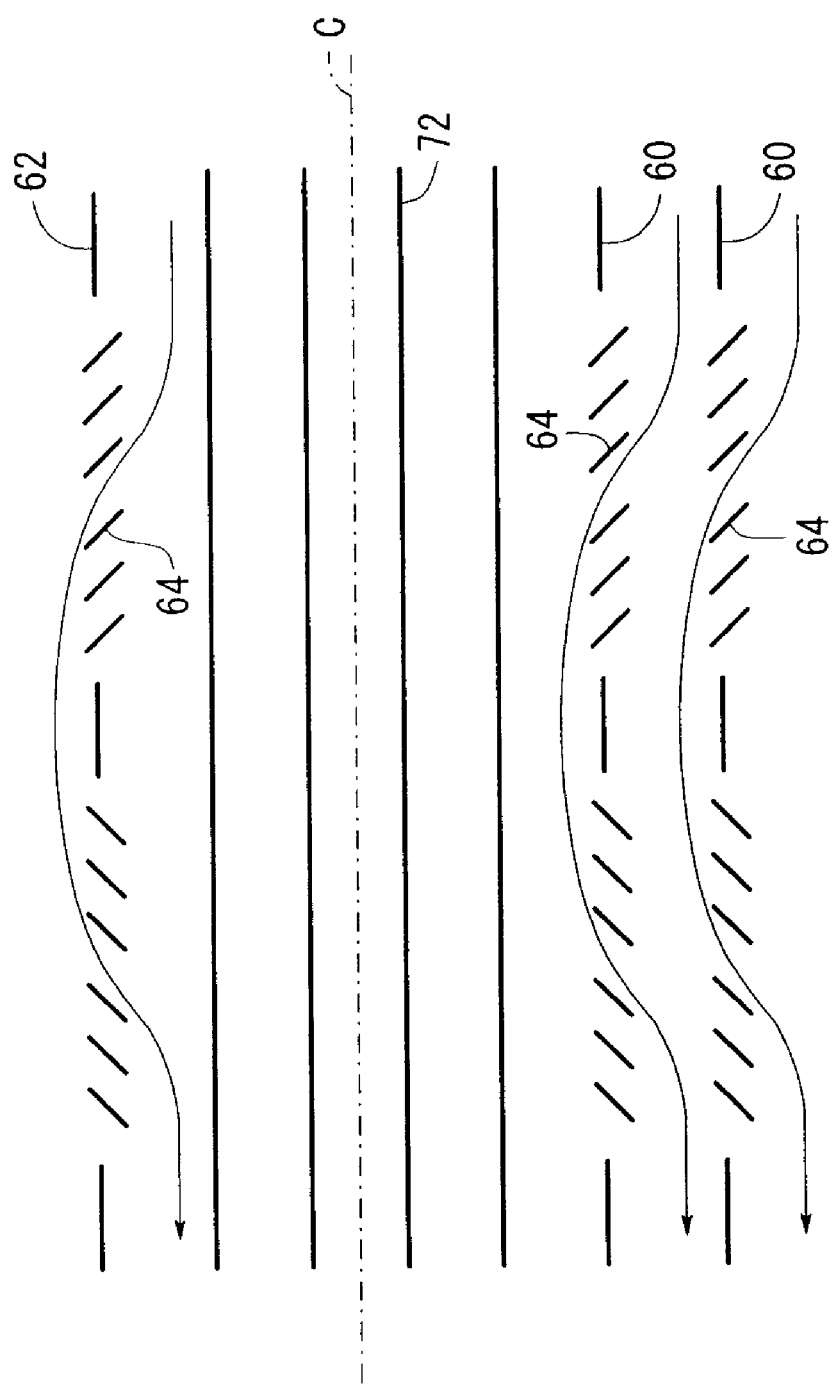
FIG. 7 is a cross sectional view taken along line VII-VII of FIG. 4.

As shown in FIGS. 4 through 7, between the first fins 60 and the second fins 62 in the heater core 20, partitioning fins (partitioning member) 72, which are bent in a wavy shape similar to the first and second fins 60, 62, are disposed at a position corresponding to a boundary portion C of the first heating section 54 and the second heating section 56. The undulating or wavy shape of the partitioning fins 72 is formed in the same manner as the wavy shapes of the first and second fins 60, 62. Also, as shown in FIG. 5, the partitioning fins 72 are connected so as to be continuous with ends of the first and second fins 60, 62.

The partitioning fins 72, for example, are formed from a metallic material, such as iron or brass, having a smaller coefficient of thermal conductivity than the first and second fins 60, 62, and the partitioning fins 72 are not provided with any louvers 64 therein. Also, in the same manner as the first and second fins 60, 62, the partitioning fins 72 are affixed by welding or the like between the tubes 58. More specifically, the partitioning fins 72 extend along the thickness direction of the heater core 20, perpendicular to the direction in which the first and second fins 60, 62 and the tubes 58 extend, and further, the partitioning fins 72 are disposed on a straight line in the widthwise direction of the heater core 20, perpendicular to the direction in which the tubes 58 extend. In addition, by means of the partitioning fins 72, flow of air between the first heating section 54 and the second heating section 56 is blocked.

The partitioning fins 72, similar to the first and second fins 60, 62, may be formed from a thin plate of aluminum or the like.

On the downstream side of the heater core 20, a fifth front passage 96 is formed. The fifth front passage 96 extends in the forward direction, and at a location that merges with the downstream side of the third front passage 42, the mixing section 48 is formed, in which cooled air supplied through the third front passage 42 and warm air supplied through the fifth front passage 96 are mixed.

A defroster blow-out port 100 opens upwardly of the mixing section 48, and to the side of the mixing section 48, a rearwardly extending sixth front passage 102 is formed.

Further, in the mixing section 48, a defroster damper 104 is rotatably disposed, facing the defroster blow-out port 100. By rotation of the defroster damper 104, the blowing state of air into the defroster blow-out port 100 and the sixth front passage 102 is switched, and the blowing rate thereof is adjusted.

In the sixth front passage 102, first vent blow-out ports 106a, 106b open upwardly, and a vent damper 108 is rotatably disposed facing toward the first vent blow-out ports 106a, 106b, and communicating with a seventh front passage 110, which extends further rearwardly. By rotation of the vent damper 108, the blowing state of air from the mixing section 48 is switched to the first vent blow-out ports 106a, 106b and the seventh front passage 110, and further, the blowing rate of the air is capable of being adjusted.

The defroster blow-out port 100 and the first vent blow-out ports 106a, 106b open respectively upwardly of the casing 12. The defroster blow-out port 100 is arranged on a forward side (in the direction of arrow A), whereas the first vent blow-out ports 106a, 106b are arranged on the rearward side (in the direction of arrow B), substantially centrally in the casing 12 with respect to the defroster blow-out port 100.

On a downstream side of the seventh front passage 110, a first heat passage 112 is connected, which extends in the widthwise direction of the casing 12 and blows air through a non-illustrated first heat blow-out port in the vicinity of the feet of passengers in the front seats in the vehicle compartment. Together therewith, a second heat passage 114 is connected, which extends rearwardly of the casing 12 and blows air through a second heat blow-out port (not shown) in the vicinity of the feet of passengers in the middle seats inside the vehicle compartment.

Figure 8:
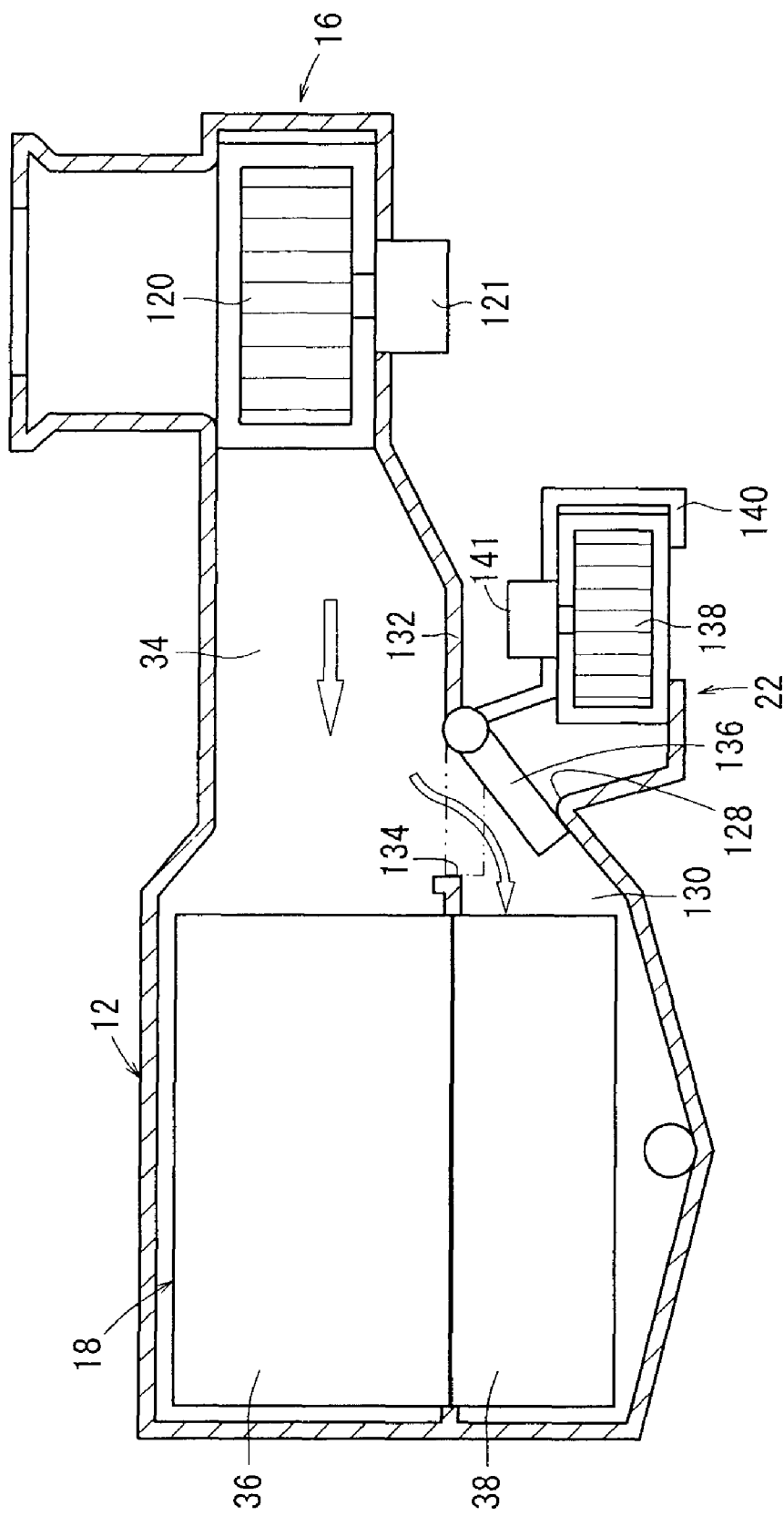
FIG. 8 is an outline structural view showing a casing, first and second blower units and an evaporator that constitute the vehicular air conditioning apparatus of FIG. 1.

The first blower unit 16, as shown in FIGS. 1 and 8, includes an intake damper 118 in which a duct 116 for introducing external air is disposed in an inlet opening thereof, for carrying out switching of internal and external air, and a first blower fan 120 for supplying to the interior of the casing 12 air (external air or internal air) that is taken in from the duct 116 or the like. A blower case 122 in which the first blower fan 120 is accommodated communicates with the interior of the casing 12 via the connection duct 14 connected to the first intake port 32. Rotation of the first blower fan 120 is controlled by a first blower motor 121, which is driven by supplying electrical power thereto.

In this manner, air supplied from the first blower unit 16 is introduced to the interior of the casing 12 through the connection duct 14 and the first intake port 32, and by rotating actions of the first air mixing damper 46, the defroster damper 104, the vent damper 108 and the bypass damper 52, which collectively make up the damper mechanism 24, air is selectively supplied through the first through seventh front passages 34, 40a, 40b, 42, 44, 96, 102, 110, and the bypass passage 50 into the defroster blow-out port 100, the first vent blow-out ports 106a, 106b and the first and second heat passages 112, 114, which are capable of blowing air to the front and middle seats in the vehicle.

On the other hand, on a lower portion of the casing 12, a second intake port 128 through which air is supplied from the second blower unit 22 is formed on a rearward side (in the direction of arrow B) perpendicular to the first intake port 32. The second intake port 128 opens at a position on an upstream side of the evaporator 18 and communicates with the first rear passage 130.

The first rear passage 130 is separated from the first front passage 34 by a first dividing wall 132, and a rotatable ventilation-switching damper (switching damper) 136 is provided between a communication opening 134 formed in the first dividing wall 132 and the second intake port 128. In addition, in the case that a mode is selected in which blowing of air from the second blower unit 22 is halted and blowing of air only from the first blower unit 16 is carried out, by blocking the second intake port 128 by the ventilation-switching damper 136 (i.e., the state shown by the two-dot-dash line in FIG. 2), back flowing of air into the second blower unit 22 can be prevented when a portion of the air supplied from the first blower unit 16 passes through the interior of the evaporator 18 and the heater core 20 and is leaked out to the sides of the first rear passage 130, later-described second rear passages 142a, 142b, the third rear passage 148, and a later-described fourth rear passage 150.

In this case, as shown in FIG. 5, by rotating the ventilation-switching damper 136 to the side of the second intake port 128 and opening the communication opening 134, a portion of the air supplied to the first front passage 34 can be supplied to the side of the first rear passage 130.

As shown in FIG. 8, the second blower unit 22 includes a second blower fan 138 that takes in air (internal air) from the vehicle compartment and supplies the intake air to the interior of the casing 12. A blower case 140 in which the second blower fan 138 is accommodated is connected to the second intake port 128 of the casing 12 and communicates with the first rear passage 130. Rotation of the second blower fan 138, similar to the first blower fan 120, is controlled by a second blower motor 141, which is driven by supplying electrical power thereto.

On a downstream side of the first rear passage 130, the second rear passages 142a, 142b are formed to which air that has passed through the second cooling section 38 of the evaporator 18 is supplied. The second rear passages 142a, 142b are separated from the second front passages 40a, 40b by a second dividing wall 144, and the second dividing wall 144 extends to the evaporator 18.

Owing thereto, on a downstream side of the evaporator 18, air that has passed through the first rear passage 130 and flows to the second cooling section 38 of the evaporator 18 does not intermix mutually with air that has passed through the first front passage 34 and flows to the first cooling section 36 of the evaporator 18.

Herein, as shown in FIG. 3, the second rear passages 142a, 142b, the second front passages 40a, 40b and the first vent blow-out ports 106a, 106b are separated respectively on sides of the first and second divided casings 26, 28 about the center plate 30, which is disposed in the center of the casing 12, thereby forming the second rear passage 142a and the second rear passage 142b, the second front passage 40a and the second front passage 40b, and the first vent blow-out port 106a and the first vent blow-out port 106b. Furthermore, a pair of communication switching dampers 146a, 146b, which are capable of switching a communication state between the second rear passage 142a and the second front passage 40a, and between the second rear passage 142b and the second front passage 40b, are disposed in the second rear passage 142a and the second rear passage 142b, respectively, wherein one of the communication switching dampers 146a and the other of the communication switching dampers 146b are rotatably controlled separately and independently from each other.

In addition, by rotation of the pair of communication switching dampers 146a, 146b, the second rear passages 142a, 142b for blowing air to the middle seats and rear seats in the vehicle compartment are placed in communication mutually with the second front passages 40a, 40b for blowing air to the front seats in the vehicle compartment. For example, by changing the rotation amount of one of the communication switching dampers 146a and the rotation amount of the other communication switching damper 146b, respectively, the blowing rate and temperature of air that is blown from the first vent blow-out port 106a through the second front passage 40a to the passenger's side in the front seats, and the blowing rate and temperature of air that is blown from the first vent blow-out port 106b through the second front passage 40b to the driver's side in the front seats, can be controlled separately from each other.

The third rear passage 148 facing the heater core 20 is formed on the downstream side of the second rear passages 142a, 142b. One side of the third rear passage 148 opens into the heater core 20, whereas another side thereof opens onto the side of the adjacent fourth rear passage 150. In addition, a second air mixing damper 152, which mixes at a predetermined mixing ratio the cool air and warm air supplied to the third rear passage 148, thereby producing mixed air, is disposed rotatably in the third rear passage 148. The second air mixing damper 152 switches the communication state between the third rear passage 148 and the upstream or downstream side of the fourth rear passage 150, which is connected to the downstream side of the heater core 20.

Consequently, air cooled by the evaporator 18 and supplied to the third rear passage 148, and air heated by the heater core 20 and that flows to the fourth rear passage 150, are mixed at a predetermined mixing ratio inside the fourth rear passage 150 by rotation of the second air mixing damper 152, and are blown out therefrom. Specifically, an intermediate location of the fourth rear passage 150 functions as a mixing section, for mixing cool air and warm air that is blown to the middle seats and rear seats in the vehicle.

The fourth rear passage 150 bends so as to circumvent the other end of the heater core 20 and extends to communicate with fifth and sixth rear passages 154, 156, which branch on a downstream side thereof. A rotatable mode-switching damper 158 is disposed at the branching location of the fifth and sixth rear passages 154, 156. The communication state between the fourth rear passage 150 and the fifth and sixth rear passages 154, 156 is switched by rotation of the mode-switching damper 158.

The fifth and sixth rear passages 154, 156 extend respectively in the rearward direction (the direction of arrow B) of the vehicle. The fifth rear passage 154 communicates with a second vent blow-out port (not shown) for blowing air in the vicinity of the faces of passengers in the middle seats in the vehicle. On the other hand, the sixth rear passage 156 communicates with third and fourth heat blow-out ports (not shown) for blowing air in the vicinity of the feet of passengers in the middle and rear seats.

More specifically, air supplied from the second blower unit 22 is introduced to the interior of the casing 12 through the second intake port 128, and under rotating actions of the second air mixing damper 152 and the mode-switching damper 158, which make up the damper mechanism 24, the air passes through the first through sixth rear passages 130, 142a, 142b, 148, 150, 154, 156 and is supplied selectively to the second vent blow-out port, and the third and fourth heat blow-out ports (not shown), which are capable of blowing air to the middle and rear seats in the vehicle.

The aforementioned second through sixth front passages 40a, 40b, 42, 44, 96, 102, the bypass passage 50 and the second rear passages 142a, 142b are disposed respectively so as to straddle between the first divided casing 26 and the second divided casing 28. However, these passages also are divided by the center plate 30, which is disposed in the center of the casing 12.

The vehicular air conditioning apparatus 10 to which the heat exchanger according to the embodiment of the present invention is applied is basically constructed as described above. Next, operations and effects of the invention shall be explained.

First, when operation of the vehicular air conditioning apparatus 10 is started, the first blower fan 120 of the first blower unit 16 is rotated by supplying electrical power thereto, and air (interior or exterior air) that is taken in through the duct 116 or the like is supplied to the first front passage 34 of the casing 12 through the connection duct 14. Simultaneously, air (interior air), which is taken in by rotation of the second blower fan 138 of the second blower unit 22 by supplying electrical power thereto, is supplied to the first rear passage 130 from the blower case 140 while passing through the second intake port 128. In the following descriptions, air supplied to the interior of the casing 12 by the first blower fan 120 shall be referred to as "first air," and air supplied to the interior of the casing 12 by the second blower fan 138 shall be referred to as "second air."

The first air and the second air supplied to the interior of the casing 12 are each cooled by passing respectively through the first and second cooling sections 36, 38 of the evaporator 18, and flow respectively as chilled air to the second front passages 40a, 40b and the second rear passages 142a, 142b, in which the first and second air mixing dampers 46, 152 are disposed.

In the case that a vent mode, for example, is selected by a passenger for blowing air in the vicinity of the faces of passengers, the first air mixing damper 46 is rotated to an intermediate position between the third front passage 42 and the fourth front passage 44, whereupon the first air (cooled air) supplied to the third front passage 42 flows into the mixing section 48, and the first air supplied to the fourth front passage 44 is heated by passing through the heater core 20 to become heated air, and flows into the mixing section 48 through the fifth front passage 96, whereby the first cooled air and the first heated air are mixed together.

The first air (mixed air), which is made up of the cool air and heated air mixed in the mixing section 48, passes through the sixth front passage 102 and is blown in the vicinity of the faces of passengers in the front seats in the vehicle compartment from the first vent blow-out ports 106a, 106b, due to the fact that the defroster blow-out port 100 is blocked by the defroster damper 104, and further, the opening of the seventh front passage 110 is blocked by the vent damper 108.

On the other hand, the second air mixing damper 152 is rotated to an intermediate position in the interior of the third rear passage 148, whereupon the second air (cooled air) supplied to the third rear passage 148 is heated by passing through the heater core 20 to become heated air, and flows to the downstream side through the fourth rear passage 150. Together therewith, cooled second air is supplied directly into the fourth rear passage 150 from the opening of the third rear passage 148, is mixed together with the heated second air, and flows to the downstream side. In addition, under a switching action of the mode-switching damper 158, the second air (mixed air) passes through the fifth rear passage 154 and is blown in the vicinity of the faces of passengers in the middle seats in the vehicle compartment from the second vent blow-out port (not shown).

Next, in the case that a bi-level mode is selected for blowing air in the vicinity of the faces and feet of passengers in the vehicle compartment, the first air mixing damper 46 is rotated somewhat toward the side of the third front passage 42, whereas the vent damper 108 is placed in an intermediate position, rotated somewhat more to the side of the first vent blow-out ports 106a, 106b as compared to the case of the vent mode. Additionally, the first cooled air that has passed through the evaporator 18 is supplied directly into the mixing section 48 via the bypass passage 50, is mixed in the mixing section 48 with the first air (mixed air) that is supplied through a third front passage 82 and the fifth front passage 96, and is blown in the vicinity of the faces of passengers from the first vent blow-out ports 106a, 106b. Further, a portion of the first air (mixed air), which flows to the sixth front passage 102 from the mixing section 48, passes through the sixth and seventh front passages 102, 110 and is supplied respectively to the first and second heat passages 112, 114, whereby the air is blown in the vicinity of the feet of passengers in the front and middle seats in the vehicle compartment from the first and second heat blow-out ports (not shown).

At the same time, the second air mixing damper 152 is rotated somewhat in a direction away from the heater core 20, and the mode-switching damper 158 is rotated from the position closing the sixth rear passage 156 to an intermediate position between the fifth rear passage 154 and the sixth rear passage 156. In addition, as for the second air, heated air heated by the heater core 20 and cooled air, which is supplied to the fourth rear passage 150 through the opening from the third rear passage 148, are mixed together and blown as mixed air from the fifth rear passage 154, through the second vent blow-out port, and in the vicinity of the faces of passengers riding in the middle seats in the vehicle compartment, while also being blown from the sixth rear passage 156, past the third and fourth heat blow-out ports, and in the vicinity of the feet of passengers riding in the middle and rear seats in the vehicle compartment.

Next, in the case that the heat mode is selected for blowing air in the vicinity of the feet of passengers in the vehicle compartment, the first air mixing damper 46 is rotated further to the side of the third front passage 42 compared to the case of the bi-level mode, while the defroster damper 104 and the vent damper 108 are rotated respectively to block the defroster blow-out port 100 and the first vent blow-out ports 106a, 106b. Consequently, the first air (mixed air), which was mixed in the mixing section 48, passes through the sixth and seventh front passages 102, 110 and flows rearwardly to be supplied respectively to the first and second heat passages 112, 114, and is blown in the vicinity of the feet of passengers in the front and middle seats in the vehicle compartment from the non-illustrated first and second heat blow-out ports.

On the other hand, the second air mixing damper 152 is rotated further toward the side of the opening compared to the case of the bi-level mode, and further, the mode-switching damper 158 is positioned to block the fifth rear passage 154. Consequently, the second air (mixed air), which is mixed in the fourth rear passage 150, passes from the fourth rear passage 150, through the sixth rear passage 156, and is supplied to the third and fourth heat blow-out ports, whereby the air is blown in the vicinity of the feet of passengers in the middle and rear seats in the vehicle compartment.

Next, an explanation shall be made concerning a heat-defroster mode for blowing air in the vicinity of the feet of passengers in the vehicle compartment, as well as for blowing air in the vicinity of a front window for eliminating fog (condensation) from the front window. In the event that the heat-defroster mode is selected, the defroster damper 104 is rotated in a direction to separate from the defroster blow-out port 100, so as to assume an intermediate position between the defroster blow-out port 100 and the opening of the sixth front passage 102, and together therewith, the first vent blow-out ports 106a, 106b are blocked by the vent damper 108 (i.e., the condition of the two-dot-dash line shown in FIG. 2). Consequently, a portion of the first air (mixed air), which is mixed in the mixing section 48, passes through the defroster blow-out port 100 and is blown in the vicinity of the front window of the vehicle, while another portion of the first air flows past the sixth and seventh front passages 102, 110 and is blown in the vicinity of the feet of passengers in the front and middle seats in the vehicle compartment from the first and second heat passages 112, 114 and the first and second heat blow-out ports (not shown).

On the other hand, in the heat-defroster mode, in the case that the second air is blown toward the middle seats and rear seats of the vehicle compartment, since this mode is the same as the heat mode discussed above, detailed explanations thereof shall be omitted.

Lastly, the defroster mode for blowing air only in the vicinity of the front window for eliminating fog (condensation) from the front window in the vehicle shall be described. In this case, the defroster damper 104 is rotated to separate from the defroster blow-out port 100 while the opening of the sixth front passage 102 is blocked, and the first air (mixed air) is supplied from the mixing section 48 to the opened defroster blow-out port 100 and is blown in the vicinity of the front window in the vehicle. In this case, the defroster mode can be handled solely by blowing first air supplied only from the first blower unit 16, without driving the second blower unit 22.

In the foregoing manner, according to the embodiment of the present invention, in between the multiple tubes 58 that make up the heater core 20, the first fins 60 are disposed on the first heating section 54, and the second fins 62 are provided, which are separate from the fins 60, and which are disposed on the second heating section 56. Between the first fins 60 and the second fins 62, the partitioning fins 72 are disposed, which are capable of blocking the flow of air through and between the first heating section 54 and the second heating section 56. Additionally, because no louvers 64 are disposed in the partitioning fins 72, air supplied to the fourth front passage 44 from the first blower unit 16 is reliably prevented from flowing to the side of the second heating section 56, which communicates with the third rear passage 148 at the interior of the heater core 20. In the same manner, air supplied to the third rear passage 148 from the second blower unit 22 is reliably prevented from flowing to the side of the first heating section 54 at the interior of the heater core 20.

Further, the partitioning fins 72 can be formed by a substantially similar manufacturing process as the first and second fins 60, 62, except for having a structure, in contrast to the first and second fins 60, 62, in which the louvers 64 are not provided therein. Therefore, the partitioning fins 72 can be manufactured easily, and manufacturing costs can be reduced.

Furthermore, because the partitioning fins 72 have a different structure separate from that of the first and second fins 60, 62, only the first and second fins 60, 62 can be fabricated by the conventional forming method. In addition, the partitioning fins 72 can be arranged freely corresponding to the position of the boundary portion C between the first heating section 54 and the second heating section 56 in the heater core 20. That is, in comparison to a conventional heat exchanger, in which a louverless portion is formed integrally within the fins, the position of the boundary portion C, which is capable of blocking flow of air between the first heating section 54 and the second heating section 56, can be set freely.

Still further, because the partitioning fins 72 are formed from a material having a smaller coefficient of thermal conductivity than the first and second fins 60, 62, which are formed, for example, from aluminum, the temperature of the air that passes through the first heating section 54 on which the first fins 60 are disposed is blocked by the partitioning fins 72, and the temperature therefrom can be prevented from being transferred to the side of the second heating section 56. Conversely, the temperature of the air that passes through the second heating section 56 on which the second fins 62 are disposed is blocked by the partitioning fins 72, and the temperature therefrom can be prevented from being transferred to the side of the first heating section 54. As a result, the temperature of the air that is subjected to heat exchange by the first heating section 54 and the temperature of the air that is subjected to heat exchange by the second heating section 56 are prevented from mutually influencing one another, and air therefrom can be made to flow downstream at desired temperatures, respectively.

Figure 9:
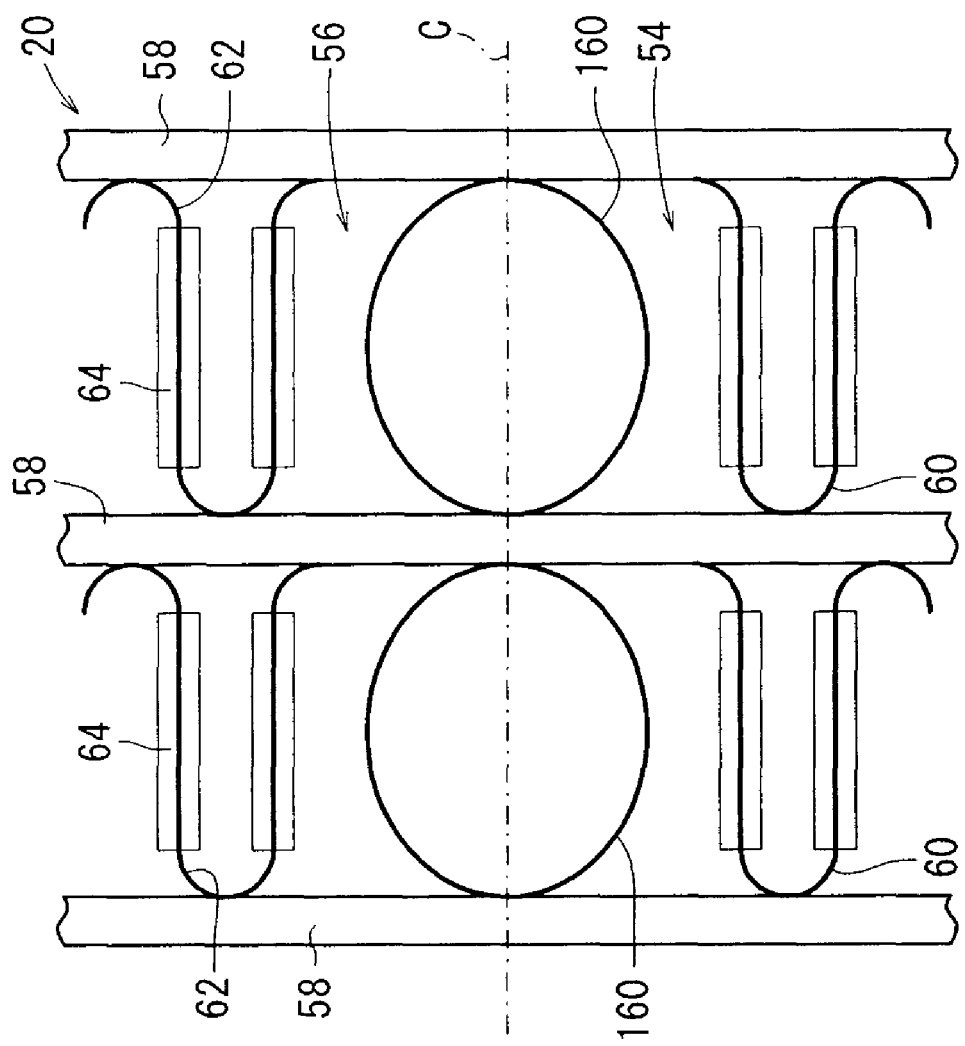
FIG. 9 is an enlarged plan view of a heater core with partitioning members installed therein according to a first modification.

On the other hand, the structure of the above-mentioned first heating section 54 and second heating section 56 being separate from each other in the heater core 20 is not limited to having the partitioning fins 72 per se. Alternatively, for example, as shown in FIG. 9, a partitioning body (partitioning member) 160 having a substantially circular shape in cross-section may be disposed between the tubes 58, or as shown in FIG. 10, a partitioning body (partitioning member) 162 having a C-shape in cross-section may be disposed between the tubes 58.

Such partitioning bodies 160, 162 are formed, for example, by extrusion molding or press molding from a thin plate material and have a given flexibility in the radial direction thereof. In addition, when installed between two of the tubes 58, the outer circumferential surfaces thereof become flexed in the radial direction and are deformed slightly by abutment against side surfaces of the tubes 58. Owing thereto, the outer circumferential surfaces of the partitioning bodies 160, 162 can be reliably affixed in close contact with respect to the two tubes 58, such that the flow of air through and between the first heating section 54 and the second heating section 56 can be securely blocked by the partitioning bodies 160, 162.

Because the partitioning bodies 162 according to the second modification have an opened cross sectional shape, compared to the partitioning body 160 according to the first modification, the partitioning bodies 162 can be flexed more suitably and can be affixed in close contact with respect to the tubes 58.

Furthermore, compared to the partitioning fins 72, the shapes of the aforementioned partitioning bodies 160, 162 are simpler, and therefore the partitioning bodies 160, 162 can be manufactured with ease and higher productivity. Hence, manufacturing cost can also be reduced, and installation thereof can be carried out favorably.

Further, in the foregoing descriptions, a structure has been explained in which the first heating section 54 and the second heating section 56 in the heater core 20 are separated by the partitioning fins 72 or by the partitioning bodies 160, 162. However, the present invention is not limited to this structure and the partitioning fins 72 or the partitioning bodies 160, 162 may be applied to the evaporator 18, for example, in order to partition the first cooling section 36 and the second cooling section 38 thereof.

The heat exchanger for use in a vehicular air conditioning apparatus according to the present invention is not limited to the above-described embodiments, and it is a matter of course that various modified or additional structures could be adopted without deviating from the essence and gist of the invention.

What is claimed is:

1. A heat exchanger for use in a vehicular air conditioning apparatus having a casing including first and second passages through which air flows, and a damper mechanism for switching a flow state of the air in the passages, and first and second blowers for supplying air respectively to the interior of the casing, wherein the heat exchanger is disposed in the interior of the casing so as to straddle between the first passage and the second passage, for thereby cooling and heating the air and supplying the air, the heat exchanger comprising:

a plurality of tubes through which a medium flows in the interior thereof;

a first fin disposed on a first heat exchanger section, the first fin being bent in a wavy shape and having an air hole therein through which the air flows, for carrying out heat exchange on the air that flows through the first passage inside the casing;

a second fin disposed on a second heat exchanger section, the second fin being bent in a wavy shape and having an air hole therein through which the air flows, for carrying out heat exchange on the air that flows through the second passage; and a partitioning member provided separately from the first and second fins and disposed between the first heat exchanger section and the second heat exchanger section, wherein the first fin and the second fin are separate and distinct from each other, wherein the partitioning member is disposed between each of the plurality of tubes and affixed to the tubes adjacent thereto so as to block the air from flowing between the first heat exchanger section and the second heat exchanger section.

2. The heat exchanger for use in a vehicular air conditioning apparatus according to claim 1, wherein the partitioning member has a wavy shaped cross section perpendicular to a direction of the air passing through the heat exchanger, in the same manner as the first and second fins, but the partitioning member does not have any air holes therein.

3. The heat exchanger for use in a vehicular air conditioning apparatus according to claim 2, wherein the partitioning member is formed from a metallic material having a smaller coefficient of thermal conductivity than a material of the first and second fins.

4. The heat exchanger for use in a vehicular air conditioning apparatus according to claim 1, wherein the partitioning member has a circular shaped cross section perpendicular to a direction of the air passing through the heat exchanger, and an outer surface of the partitioning member abuts against the tubes.

5. The heat exchanger for use in a vehicular air conditioning apparatus according to claim 4, wherein the partitioning member is formed from a metallic material having a smaller coefficient of thermal conductivity than a material of the first and second fins.

6. The heat exchanger for use in a vehicular air conditioning apparatus according to claim 1, wherein the heat exchanger comprises a plurality of partitioning members respectively having a wavy shape in a cross section perpendicular to a direction of the air passing through the heat exchanger.

7. The heat exchanger for use in a vehicular air conditioning apparatus according to claim 1, wherein the heat exchanger comprises a plurality of partitioning members respectively having a wavy shape in a cross section perpendicular to a direction of the air passing through the heat exchanger, and peaks of the wavy shape of the partitioning member are in contact with the tubes.

8. The heat exchanger for use in a vehicular air conditioning apparatus according to claim 1, wherein the heat exchanger comprises a plurality of partitioning members respectively having a wavy shape in a cross section perpendicular to a direction of the air passing through the heat exchanger, and peaks of the wavy shape of the partitioning member are attached to the tubes by welding.

9. The heat exchanger for use in a vehicular air conditioning apparatus according to claim 1, wherein the heat exchanger comprises a plurality of partitioning members respectively having a circular shape in a cross section perpendicular to a direction of the air passing through the heat exchanger.

10. The heat exchanger for use in a vehicular air conditioning apparatus according to claim 1, wherein the heat exchanger comprises a plurality of partitioning members respectively having a circular shape in a cross section perpendicular to a direction of the air passing through the heat exchanger, and two portions of the circular shape of the partitioning member are in contact with the tubes.

11. The heat exchanger for use in a vehicular air conditioning apparatus according to claim 1, wherein the heat exchanger comprises a plurality of partitioning members respectively having a circular shape in a cross section perpendicular to a direction of the air passing through the heat exchanger, and two portions of the circular shape of the partitioning member are attached to the tubes by welding.

12. The heat exchanger for use in a vehicular air conditioning apparatus according to claim 1, wherein the heat exchanger comprises a plurality of partitioning members respectively having a C-shape in a cross section perpendicular to a direction of the air passing through the heat exchanger.

13. The heat exchanger for use in a vehicular air conditioning apparatus according to claim 1, wherein the heat exchanger comprises a plurality of partitioning members respectively having a C-shape in a cross section perpendicular to a direction of the air passing through the heat exchanger, and two portions of the C-shape of the partitioning member are in contact with the tubes.

14. The heat exchanger for use in a vehicular air conditioning apparatus according to claim 1, wherein the heat exchanger comprises a plurality of partitioning members respectively having a C-shape in a cross section perpendicular to a direction of the air passing through the heat exchanger, and two portions of the C-shape of the partitioning member are attached to the tubes by welding.

15. The heat exchanger for use in a vehicular air conditioning apparatus according to claim 1, wherein the first and second fins have planar surfaces and cut out portions on the planar surfaces to form the holes, the cut out portions being inclined at predetermined angles with respect to the planar surfaces.

16. The heat exchanger for use in a vehicular air conditioning apparatus according to claim 1, further comprising:
a first blower motor that drives the first blower; and
a second blower motor that drives the second blower.

17. The heat exchanger for use in a vehicular air conditioning apparatus according to claim 1, further comprising:
a first intake port through which air is supplied from the first blower to the first passage; and
a second intake port through which air is supplied from the second blower to the second passage, the second intake port being formed perpendicularly to the first intake port.

18. The heat exchanger for use in a vehicular air conditioning apparatus according to claim 1, further comprising:
a first blower motor that drives the first blower;
a second blower motor that drives the second blower;
a first intake port through which air is supplied from the first blower to the first passage;
a second intake port through which air is supplied from the second blower to the second passage, the second intake port being formed perpendicularly to the first intake port; and
a ventilation-switching damper that blocks the second intake port to prevent back flowing of air into the second blower from the first blower when blowing of air from the second blower is halted and blowing of air only from the first blower is carried out.

19. The heat exchanger for use in a vehicular air conditioning apparatus according to claim 1, further comprising:
a first blower motor that drives the first blower;
a second blower motor that drives the second blower;
a first intake port through which air is supplied from the first blower to the first passage; and
a second intake port through which air is supplied from the second blower to the second passage, the second intake port being formed perpendicularly to the first intake port;
wherein in a defroster mode the first blower is solely driven to supply air without driving the second blower.

20. A heat exchanger for use in a vehicular air conditioning apparatus having a casing including first and second passages through which air flows, and a damper mechanism for switching a flow state of the air in the passages, and first and second blowers for supplying air respectively to the interior of the casing, wherein the heat exchanger is disposed in the interior of the casing so as to straddle between the first passage and the second passage, for thereby cooling and heating the air and supplying the air, the heat exchanger comprising:
a plurality of tubes through which a medium flows in the interior thereof;
a first fin disposed on a first heat exchanger section, the first fin having a wavy shape in a cross section perpendicular to a direction of the air passing through the heat exchanger and having an air hole therein through which the air flows, for carrying out heat exchange on the air that flows through the first passage inside the casing;
a second fin disposed on a second heat exchanger section, the second fin having a wavy shape in a cross section perpendicular to the direction of the air passing through the heat exchanger and having an air hole therein through which the air flows, for carrying out heat exchange on the air that flows through the second passage; and
a plurality of partitioning members provided separately from the first and second fins and disposed between the first heat exchanger section and the second heat exchanger section, and respective partitioning members being disposed between the tubes,
wherein the partitioning member blocks the air from flowing between the first heat exchanger section and the second heat exchanger section; and
the plurality of partitioning members respectively have a shape in a cross section perpendicular to the direction of the air passing through the heat exchanger selected from a group consisting of a wavy shape, a circular shape, and a C-shape, and when the cross sectional shape is the circular shape or the C-shape, the air passes through the inside of the circular shaped cross section or the C-shaped cross section.

* * * * *